United States Patent
Johnson

(10) Patent No.: US 10,429,891 B2
(45) Date of Patent: *Oct. 1, 2019

(54) PIVOTABLE VEHICLE MOUNTING SYSTEM FOR MOBILE COMPUTING DEVICES

(71) Applicant: VOXX INTERNATIONAL CORPORATION, Hauppauge, NY (US)

(72) Inventor: Kenneth L. Johnson, Sanford, FL (US)

(73) Assignee: VOXX INTERNATIONAL CORPORATION, Hauppauge, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/918,808

(22) Filed: Mar. 12, 2018

(65) Prior Publication Data

US 2018/0203485 A1    Jul. 19, 2018

Related U.S. Application Data

(63) Continuation of application No. 13/839,133, filed on Mar. 15, 2013, now Pat. No. 9,915,976.

(51) Int. Cl.
*G06F 1/16* (2006.01)
*B60R 11/00* (2006.01)
*B60R 11/02* (2006.01)

(52) U.S. Cl.
CPC ............ *G06F 1/1632* (2013.01); *B60R 11/00* (2013.01); *B60R 11/0235* (2013.01); *B60R 11/0252* (2013.01); *B60R 2011/0017* (2013.01); *B60R 2011/0075* (2013.01)

(58) Field of Classification Search
CPC ......... B60R 11/0235; B60R 2011/0017; B60R 11/0252
USPC ........................................................ 361/807
See application file for complete search history.

(56) References Cited

U.S. PATENT DOCUMENTS

| | | | |
|---|---|---|---|
| 2006/0032996 A1 | 2/2006 | Wu | |
| 2008/0252798 A1 | 10/2008 | Vitito | |
| 2012/0162891 A1* | 6/2012 | Tranchina | B60R 11/0252 361/679.26 |
| 2013/0181492 A1* | 7/2013 | Prescott | B60R 7/088 297/217.1 |
| 2013/0259261 A1 | 10/2013 | Mitchell | |
| 2013/0277520 A1* | 10/2013 | Funk | F16M 13/02 248/274.1 |
| 2014/0268544 A1 | 9/2014 | Johnson | |

* cited by examiner

*Primary Examiner* — Jamie J Atala
*Assistant Examiner* — Masum Billah
(74) *Attorney, Agent, or Firm* — F. Chau & Associates, LLC

(57) ABSTRACT

A mounting device includes a cradle including a first recess and configured to be mounted in a vehicle, a pivotable hinge member coupled to the cradle, and a docking tray coupled to the pivotable hinge member. The docking tray is configured to lock in a first position within the first recess in the cradle, and lock in a second position extending outward from the first recess in the cradle. The docking tray includes a second recess shaped and dimensioned to receive an electronic computing device.

20 Claims, 15 Drawing Sheets

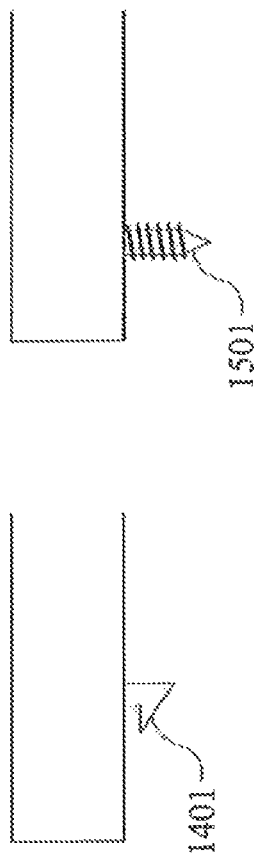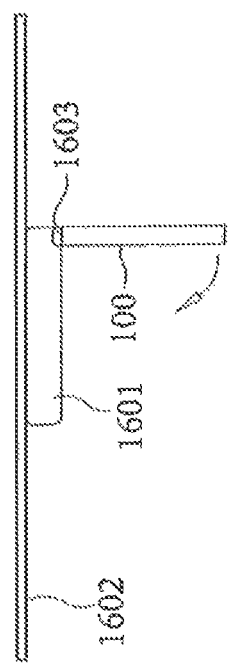

PIVOTABLE VEHICLE MOUNTING SYSTEM FOR MOBILE COMPUTING DEVICES

CROSS-REFERENCE TO RELATED APPLICATIONS

This application is a Continuation Application of U.S. application Ser. No. 13/839,133, filed on Mar. 15, 2013, the disclosure of which is herein incorporated by reference in its entirety.

TECHNICAL FIELD

The present disclosure relates to a vehicle entertainment cradle, and more particularly, to a vehicle entertainment cradle mounted in a vehicle and configured to allow mobile computing devices, such as tablet computers and smartphones, to be pivotally mounted within the cradle.

DISCUSSION OF RELATED ART

As society becomes more mobile and spends a greater amount of time traveling and away from home, demand rises for electronic devices that can be used outside the home environment. Mobile computing devices, including tablet computers and smartphones such as the Apple® iPad® and Apple® iPhone®, are becoming more prevalent in today's society due to the ease in which they can be used in a mobile environment. These mobile computing devices are frequently used to view media content while traveling in vehicles.

BRIEF SUMMARY

According to an exemplary embodiment of the present disclosure, a mounting device includes a cradle including a first recess and configured to be mounted in a vehicle, a pivotable hinge member coupled to the cradle, and a docking tray coupled to the pivotable hinge member. The docking tray is configured to lock in a first position within the first recess in the cradle, and lock in a second position extending outward from the first recess in the cradle. The docking tray includes a second recess shaped and dimensioned to receive an electronic computing device.

In an exemplary embodiment, a securing member is disposed on a first end of the docking tray, and a connection member is disposed on a second end of the docking tray, opposing the first end. The connection member includes a connection port configured to matingly receive a connector of the electronic computing device and supply power to the electronic computing device. The securing member is configured to slidably move in a first direction away from the docking tray to receive the electronic computing device into the docking tray, and slidably move in a second direction toward the docking tray to secure the electronic computing device within the docking tray.

In an exemplary embodiment, the docking tray is configured to alternate between locking in the first and second positions in response to a force being applied to the docking tray in a direction toward the first recess in the cradle.

In an exemplary embodiment, the pivotable hinge member is coupled to the cradle near a center of the cradle and is coupled to the docking tray near a center of the docking tray.

In an exemplary embodiment, the docking tray is configured to rotate about a plurality of axes while the docking tray is in the second position.

In an exemplary embodiment, the docking tray is configured to rotate about two axes while the docking tray is in the second position.

In an exemplary embodiment, a first axis of the two axes is a rotation axis and a second axis of the two axes is a tilt axis. An orientation of the electronic computing device while coupled to the docking tray is adjusted upon rotating the docking tray about the rotation axis, and a viewing angle of the electronic computing device while coupled to the docking tray is adjusted upon rotating the docking tray about the tilt axis.

In an exemplary embodiment, the electronic computing device includes a tablet device or a smartphone.

In an exemplary embodiment, the cradle is disposed in a vehicle headrest.

In an exemplary embodiment, a front surface of the electronic computing device is substantially flush with an outer surface of the vehicle headrest while the electronic computing device is coupled to the docking tray and while the docking tray is in the first position.

In an exemplary embodiment, the cradle is configured to be disposed in an overhead in the vehicle.

According to an exemplary embodiment of the present disclosure, a mounting device includes a cradle including a first recess and configured to be mounted in a vehicle headrest, a pivotable hinge member coupled to the cradle, and a docking tray coupled to the pivotable hinge member. The docking tray is configured to lock in a first position within the first recess in the cradle, and lock in a second position extending outward from the first recess in the cradle. The docking tray includes a second recess shaped and dimensioned to receive a tablet device. The docking tray is configured to alternate between locking in the first and second positions in response to a force being applied to the docking tray in a direction toward the first recess in the cradle. The docking tray is configured to rotate about a rotation axis and a tilt axis while the docking tray is in the second position, wherein an orientation of the tablet device while coupled to the docking tray is adjusted upon rotating the docking tray about the rotation axis, and a viewing angle of the tablet device while coupled to the docking tray is adjusted upon rotating the docking tray about the tilt axis.

According to an exemplary embodiment of the present disclosure, a mounting device includes a cradle configured to be mounted in a vehicle headrest, a pivotable hinge member coupled to the cradle, and a docking tray coupled to the pivotable hinge member, and shaped and dimensioned to receive an electronic computing device. The docking tray is configured to rotate about a rotation axis and a tilt axis while disposed in an area between the cradle and a vehicle seat facing the cradle. An orientation of the electronic computing device while coupled to the docking tray is adjusted upon rotating the docking tray about the rotation axis, and a viewing angle of the electronic computing device while coupled to the docking tray is adjusted upon rotating the docking tray about the tilt axis.

According to an exemplary embodiment of the present disclosure, a mounting system includes a cradle configured to be mounted in a vehicle, a pivotable hinge member coupled to the cradle, a docking tray coupled to the pivotable hinge member, a securing member disposed on a first end of the docking tray, a connection member disposed on a second end of the docking tray, opposing the first end, and a plurality of removable connection adapters, each including a different connection port configured to matingly receive a connector of different electronic computing devices and supply power to the different electronic computing device.

The docking tray is configured to lock in a first position within the cradle, and lock in a second position extending outward from the cradle. The docking tray is shaped and dimensioned to receive an electronic computing device. The securing member is configured to slidably move in a first direction away from the docking tray to receive the electronic computing device into the docking tray, and slidably move in a second direction toward the docking tray to secure the electronic computing device within the docking tray. The connection member includes a recess shaped and dimensioned to receive a removable connection adapter.

BRIEF DESCRIPTION OF THE SEVERAL VIEWS OF THE DRAWINGS

Exemplary embodiments of the present disclosure will be described below in more detail, with reference to the accompanying drawings, in which:

FIGS. 14 and 15 show means of mounting a cradle configured to receive a tablet device to a headrest in a seat of a vehicle, according to exemplary embodiments of the present disclosure.

FIG. 16 shows a cradle mounted in an overhead position in a vehicle and configured to receive a tablet device, according to an exemplary embodiment of the present disclosure.

DETAILED DESCRIPTION

Exemplary embodiments of the present disclosure now will be described more fully hereinafter with reference to the accompanying drawings. This disclosure, may however, be embodied in many different forms and should not be construed as limited to embodiments set forth herein.

Exemplary embodiments of the present disclosure relate to a vehicle entertainment cradle shaped and dimensioned to accommodate a variety of mobile computing devices, and permitting the mounted mobile computing devices to be pivotably mounted within the cradle. Pivotably mounting the mobile computing device allows the device to be rotated about a plurality of axes. The cradle may be shaped and dimensioned to receive a variety of mobile computing devices such as, for example, tablet devices and smartphones having different sizes and shapes. That is, the cradle may be configured to receive a variety of different mobile computing devices made by different manufacturers such as the Apple® iPad®, the Apple® iPad Mini®, the Apple® iPhone®, or various other tablet devices or smartphones. The cradle may be positioned in a variety of locations such as, for example, disposed within a headrest of a seat in a vehicle, mounted to a headrest of a seat in a vehicle, within a seat back of a seat in a vehicle, in an overhead position within a vehicle, mounted in the dashboard or center console of a vehicle, or in any other convenient location of a vehicle.

Figure 1:
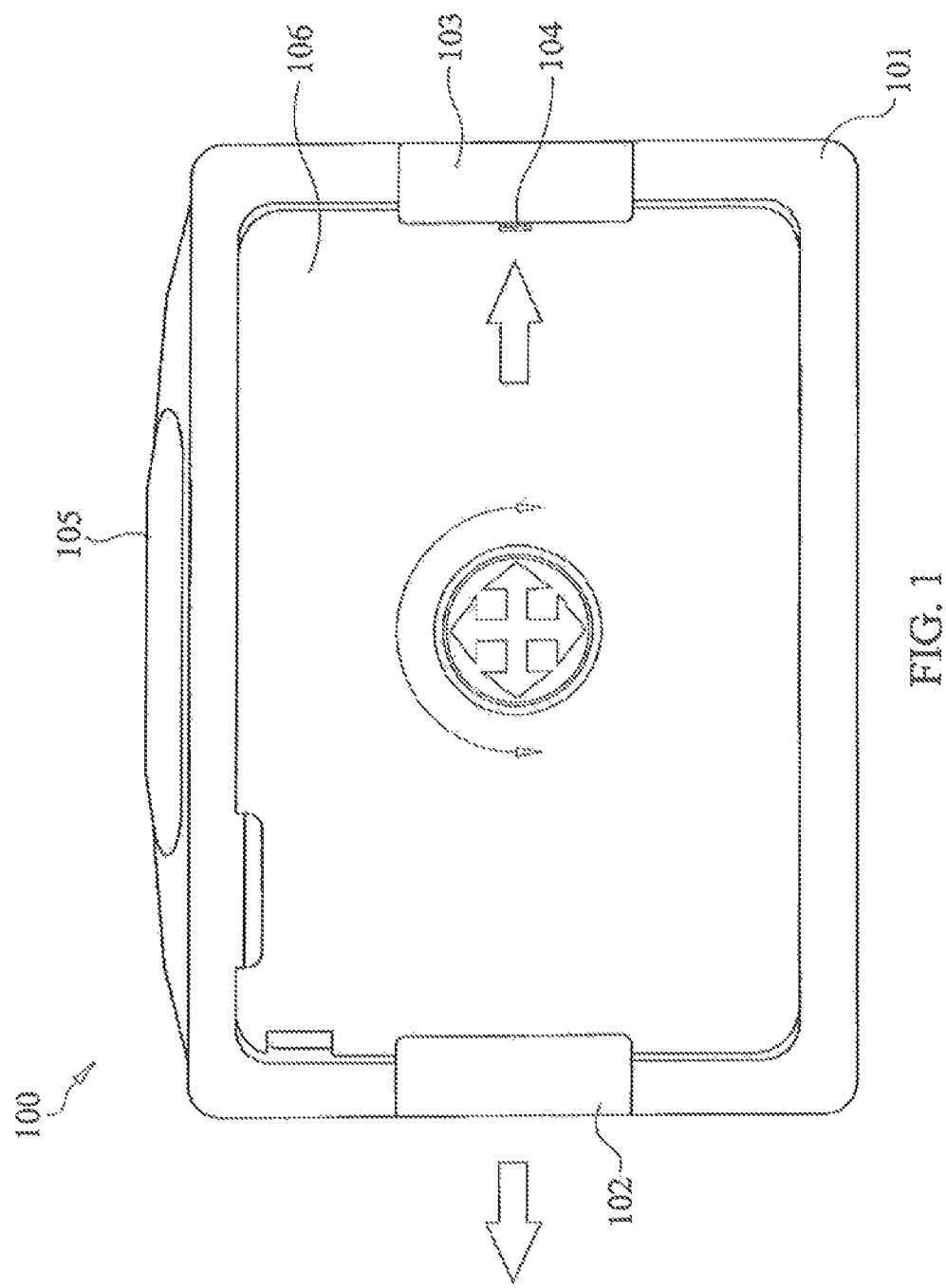
FIGS. 1 to 3 show a front view of a cradle mounted in a vehicle and configured to receive a tablet device, according to an exemplary embodiment of the present disclosure.
Figure 2:
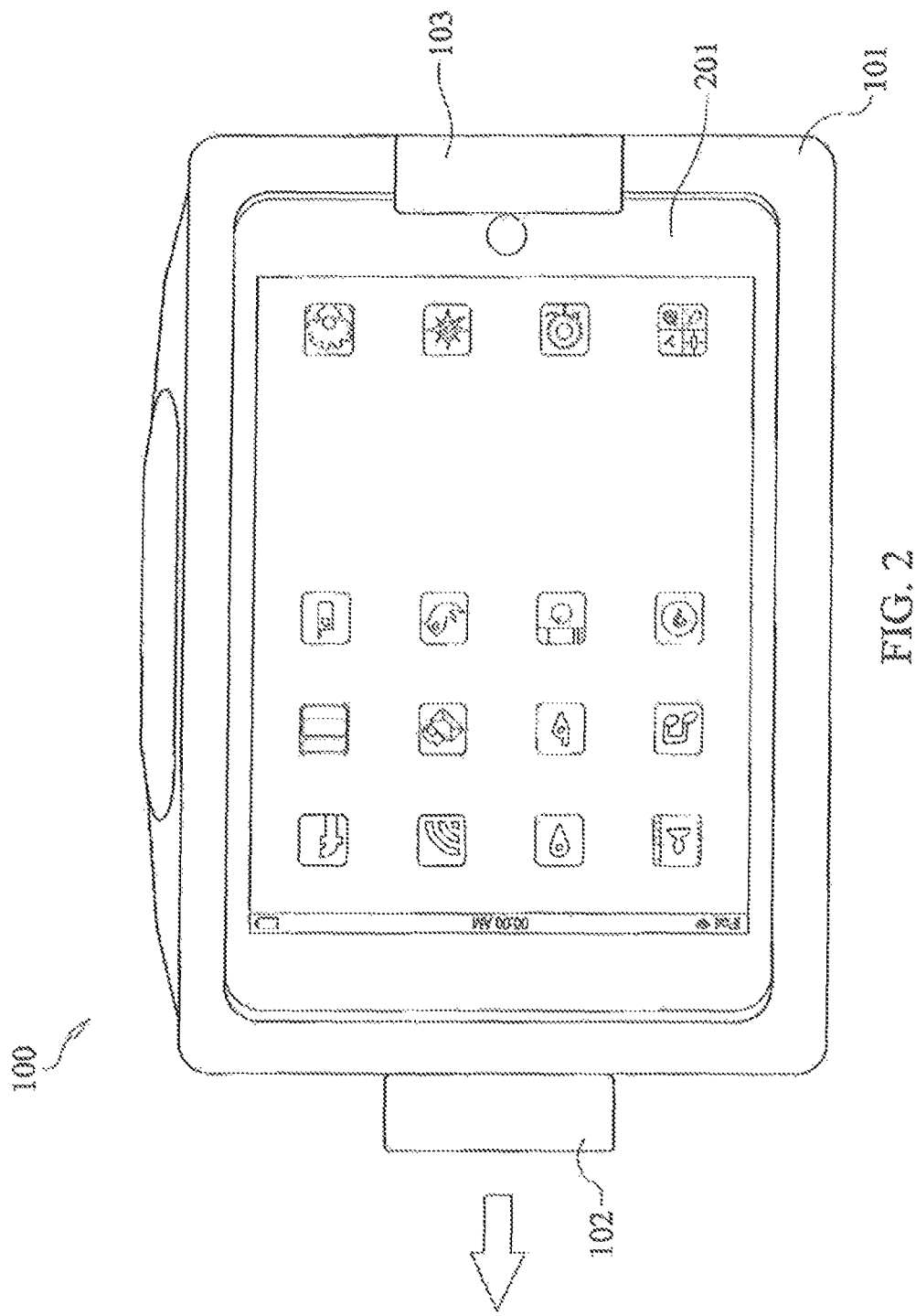
Figure 3:
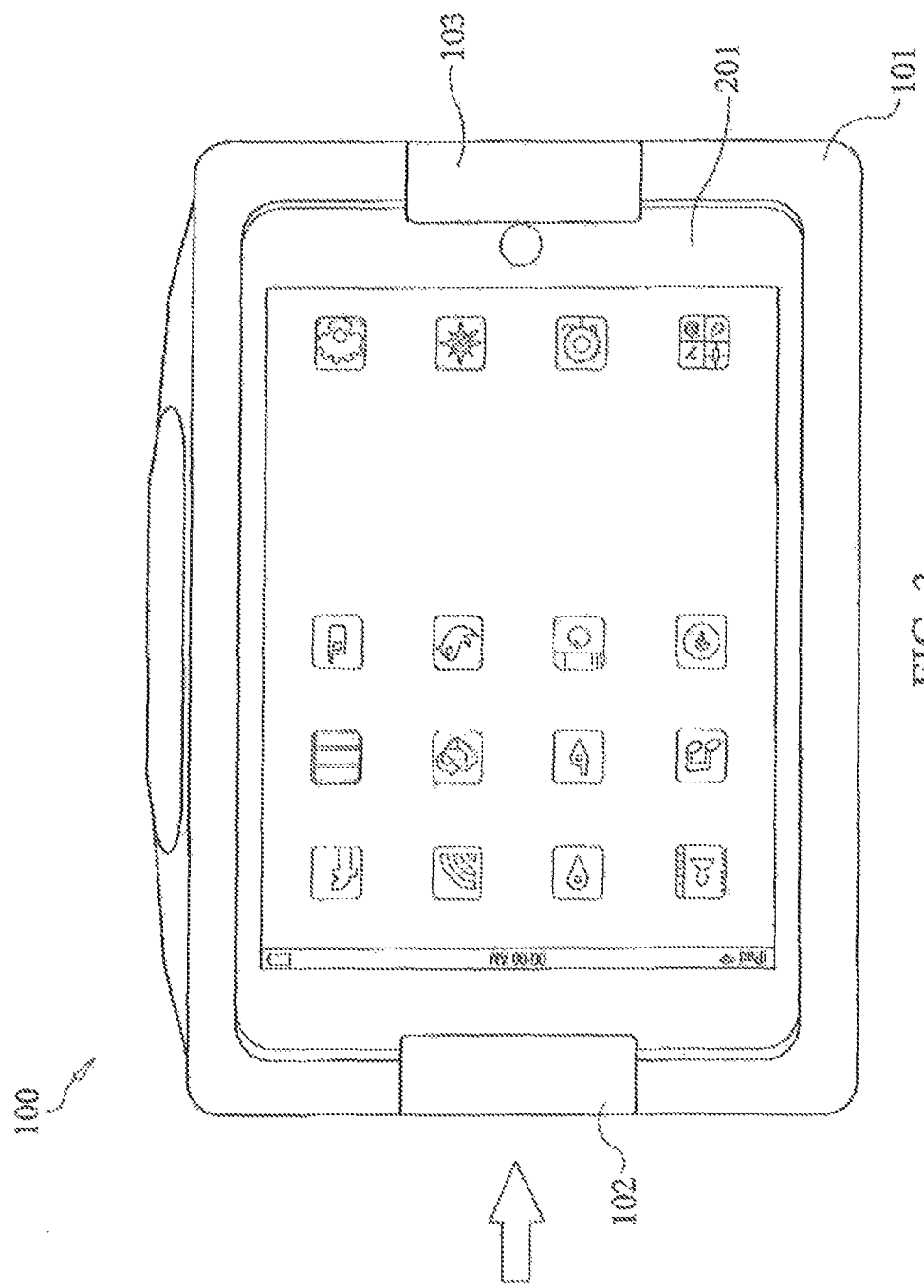

FIGS. 1 to 3 show a front view of a cradle mounted in a vehicle, according to an exemplary embodiment of the present disclosure.

As shown in FIG. 1, the cradle 100 is shaped and dimensioned to receive a tablet device such as, for example, the Apple® iPad® or the Apple® iPad Mini®. Although exemplary embodiments described herein refer to the cradle 100 being shaped and dimensioned to receive a tablet device, exemplary embodiments are not limited thereto. For example, the cradle 100 may be shaped and dimensioned to receive various mobile computing devices, including tablet devices having different sizes, smartphones having different sizes, etc.

The cradle 100 includes a docking tray 101 including a recess 106 into which the tablet device is mounted. The depth of the recess may be designed such that the tablet device fits within the recess and is substantially flush with the bezel 504 of the cradle 100 when mounted. For example, the depth of the recess 106 may be between about 0.25 inches and about 0.6 inches. The docking tray 101 includes a securing member 102 and a connection member 103 disposed on opposite side of the cradle 101. The securing member 102 may slide outward in a first direction, as indicated by the arrow in FIG. 1. The first direction in which the securing member 102 slides may be, for example, a substantially horizontal direction when the docking tray 101 is in a landscape orientation, or a substantially vertical direction when the docking tray 101 is in a portrait orientation. The securing member 102 may lock in an open position (e.g., a position in which the docking tray 101 is ready to receive the tablet device) and a closed position (e.g., a position in which the tablet device is secured within the docking tray 101). In an exemplary embodiment, a spring-loaded mechanism is included in the securing member 102 and is utilized to slidably move the securing member 101 in the first direction, and lock the securing member 102 in the closed position. The securing mechanism 102 may utilize a variety of other mechanisms in combination with the spring-loaded mechanism or in place of the spring-loaded mechanism including, for example, a protrusion(s) and a corresponding detent(s) to lock the securing mechanism in the open and/or closed positions, a latch member and release button, etc.

The connection member 103 includes a connection port 104 that electrically connects the tablet device to the cradle 100. The connection port 104 may include a variety of connection types adapted to connect to different tablet units such as, for example, a USB port (e.g., a microUSB port or a mini-USB port) or other proprietary connection types such as a lightning connector or a 30-pin connector compatible with the Apple® iPad® or the Apple® iPad Mini®. Once electrically connected via the connection port 104, the tablet device may be connected to the vehicle's power system and/or audio/video system. As a result, the tablet device may be charged while the tablet is docked, and audio and/or video may be transmitted between the tablet device and a speaker and/or a display located within the vehicle and separate from the tablet device via the cradle 100.

In an exemplary embodiment, connection adapters may be utilized to conveniently change the type of connection port 104 included in the docking tray 101. For example, the connection port 104 may be disposed on a removable connection adapter configured to be removably connect to and disconnect from the connection member 103 (e.g., via a recess in the connection member 103), which electrically connects to the connection member 103 via mating electrical connections disposed in the recess and on the connection adapter. As a result, a universal cradle 100 may be utilized with a variety of different tablet devices having different connectors (e.g., a USB port, lightning connector, 30-pin connector, etc.) by way of utilizing removable connection adapters. Alternatively, the docking tray 101 may be removably connected to the cradle 100, allowing different docking trays 101 having different connection ports 104 to be interchanged.

To secure the tablet device to the cradle 100, the securing member 102 is slidably moved in the first direction away from the cradle 100, into an open position, as indicated by the arrow shown in FIG. 2. When the securing member 102 is in the open position, the tablet device 201 may be inserted into the docking tray 101. When inserting the tablet device 201 into the docking tray 101, the connection port of the tablet device 201 is connected to the connection port 104 on the connection member 103, electrically connecting the tablet device to the cradle 100. Once the tablet device 201 has been inserted to the docking tray 101, the securing member 102 is slidably moved in a second direction substantially opposite to the first direction toward the cradle 100, into a closed position, as indicated by the arrow shown in FIG. 3.

Figure 4:
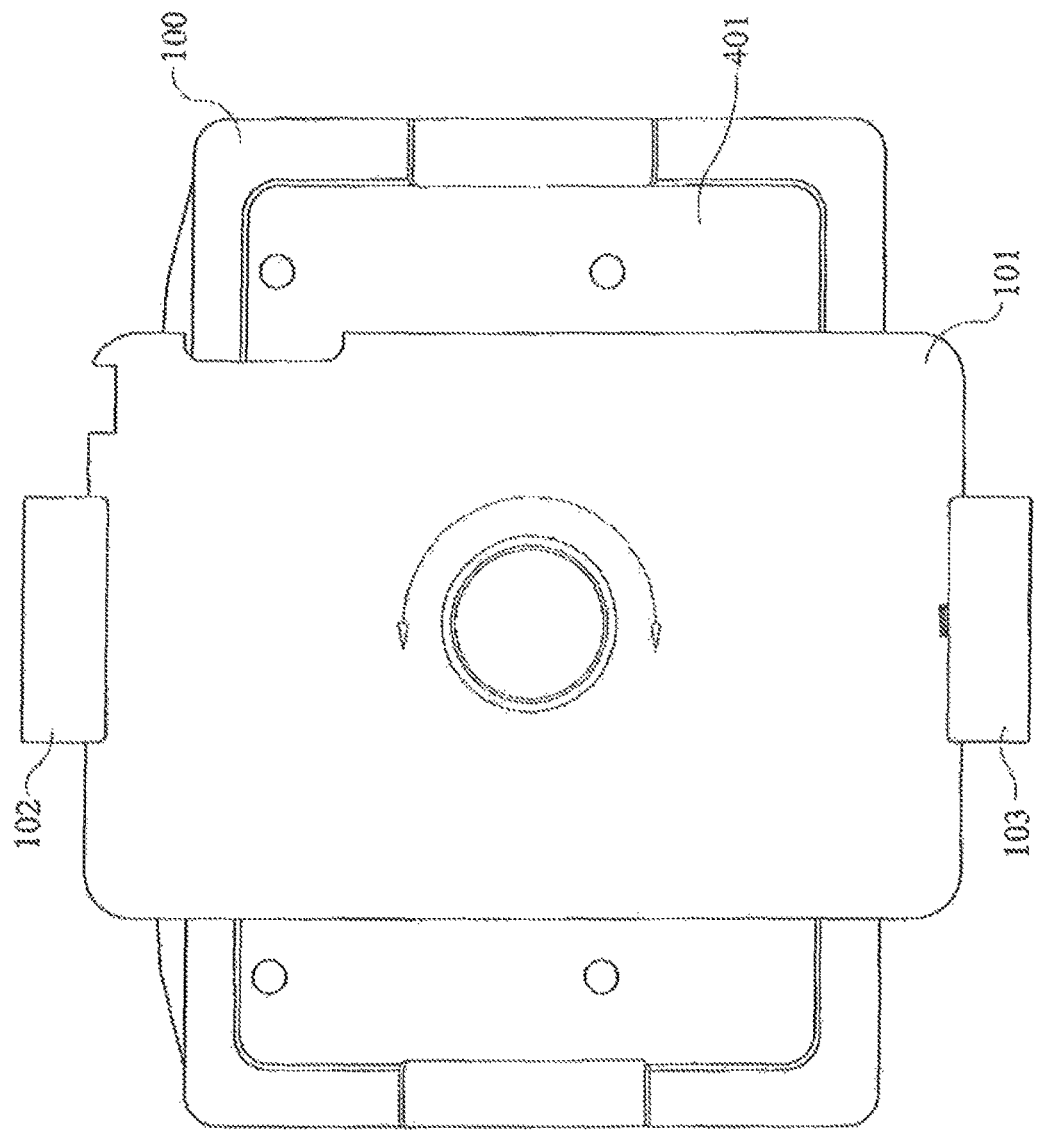
FIG. 4 shows a front view of a cradle mounted in a vehicle and configured to receive a tablet device while in a pivot mode, according to an exemplary embodiment of the present disclosure.
Figure 5:
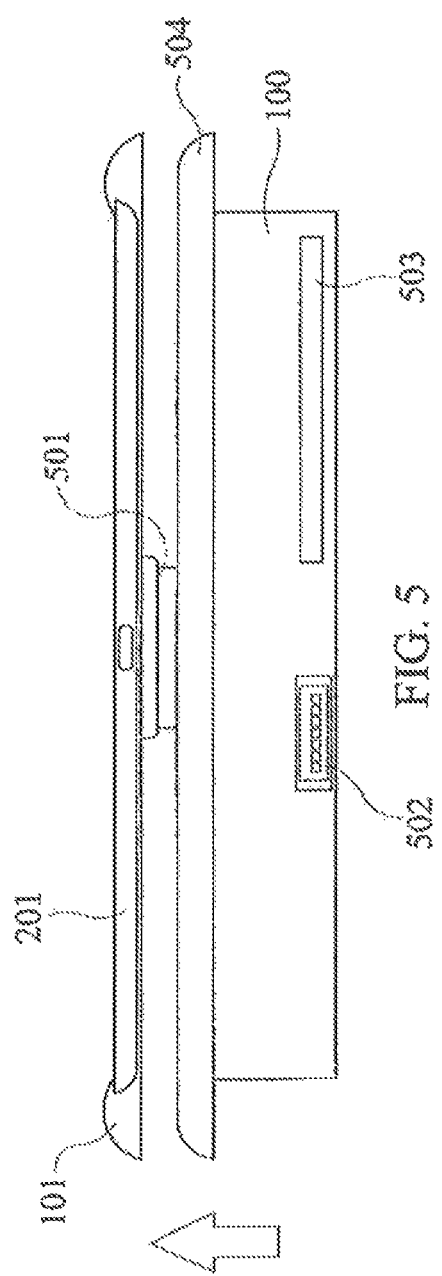
FIG. 5 shows a bottom view of a cradle mounted in a vehicle and configured to receive a tablet device while in a pivot mode, according to an exemplary embodiment of the present disclosure.
Figure 6:
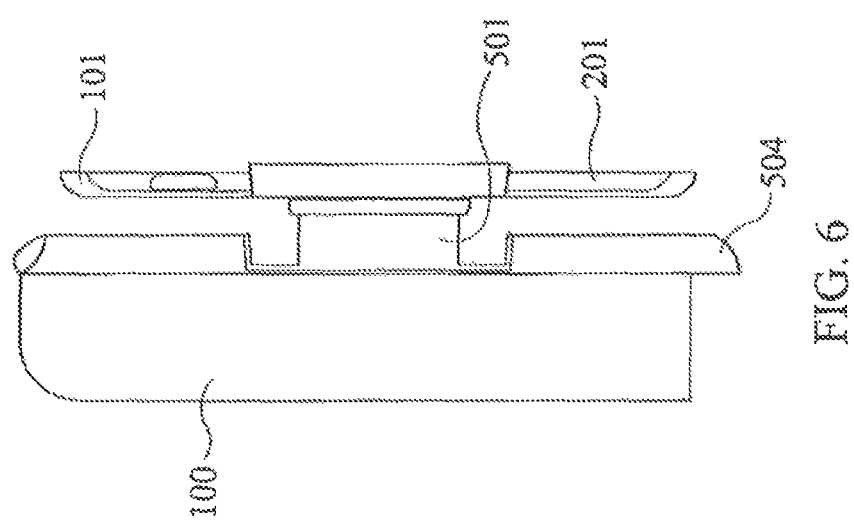
FIG. 6 shows a side view of a cradle mounted in a vehicle and configured to receive a tablet device while in a pivot mode, according to an exemplary embodiment of the present disclosure.

The docking tray 101 is connected to the cradle 100 via a pivotable hinge member 501, as shown in FIGS. 5 and 6. The pivotable hinge member 501 is configured to allow the docking tray 101 to utilize a push-in/pop-out design, and to rotate about a plurality of axes. Using the push-in/pop-out design, the docking tray 101 may alternate between a first position in which the docking tray 101 is recessed within the cradle 100 (e.g., within a recess 401 in the cradle 100 as shown in FIG. 4), and a second position in which the docking tray 101 extends out of the cradle 100 and is located in an area in front of the face of the cradle 100. For example, the docking tray 101 may alternate between locking in the first and second positions in response to a user applying a force to the docking tray 101 in a direction toward the recess in the cradle 100 (e.g., pushing the docking tray 101 in toward the cradle 100). FIGS. 4-6 show the docking tray 101 in the second position in which the docking tray 101 extends out of the cradle 100.

The pivotable hinge member 501 may be disposed in an area between the cradle 100 and the docking tray 101, and may be disposed substantially near the center of the cradle 100 and the docking tray 101, as shown in FIGS. 5 and 6. Disposing the pivotable hinge member 501 near the center of the cradle 100 and the docking tray 101 provides structural support for when the user applies a force to the docking tray 101 to utilize the push-in/pop-out design, however the location of the pivotable hinge member 501 is not limited thereto. The cradle 100 may include a pivotable hinge member receiving recess shaped and dimensioned to receive the pivotable hinge member 501 when the docking tray 101 is in the first position in which the docking tray 101 is recessed within the cradle 100.

The pivotable hinge member 501 may be spring-loaded. The push-in/pop-out design is implemented via utilization of the pivotable hinge member 501, which allows for the docking tray 101 to be alternated between the first and second positions. The pivotable hinge member 501 locks the docking tray 101 in one of the first and second position. For example, when the docking tray 101 is in the first position in which the docking tray 101 is recessed within the cradle 100, the docking tray 101 may be pushed in toward the cradle 100 to activate the pivotable hinge member 501 and transition from the first locked position to the second locked position. Activation of the pivotable hinge member 501 results in the docking tray 101 unlocking, and popping out in a direction away from the cradle 100 and into the second position. Once in the second position, the docking tray 101 locks. When the docking tray 101 is in the second position, the docking tray 101 may be pushed in toward the cradle 100 to activate the pivotable hinge member 501 and transition from the second locked position to the first locked position. Activation of the pivotable hinge member 501 results in the docking tray 101 unlocking, and being pushed in toward the cradle 100 and into the first position. Once in the first position, the docking tray 101 locks such that the docking tray 101 is recessed within the cradle 100. Locking and unlocking of the docking tray 101 may be implemented via the spring-loaded design of the pivotable hinge member 501. That is, the pivotable hinge member 501 may function as both a pivoting (e.g., rotating and tilting) mechanism and a locking mechanism.

While in the first position, the docking tray 101 is disposed within the recess 401 of the cradle 100. When the tablet device 201 is secured within the docking tray 101 and the docking tray 101 is in the first position, a front surface of the tablet device 201 may be substantially flush with the bezel 504 of the cradle 100, which may be substantially flush with an outer surface of a headrest when the cradle 100 is mounted within a headrest. Thus, the front surface of the tablet device 201 may be substantially flush with an outer surface of the headrest while the docking tray 101 is in the first position. As a result, the tablet device 201 occupies a small amount of space within the vehicle since the tablet device 201 is recessed within the headrest, and provides a clean presentation of the mounted tablet device 201 to the user. While in the first position, the tablet device 201 may be disposed in a landscape configuration, as shown in FIGS. 2 and 3, allowing the user to view video and utilize a variety of other functions of the tablet device 201.

The second position of the docking tray 101 corresponds to a pivot mode. While in the pivot mode, the docking tray 101, including a tablet device 201 that may be mounted therein, is disposed in an area in front of the face of the cradle 100, as shown in FIGS. 4 to 6. That is, in the pivot mode, the docking tray 101 extends away from the recess 401 of the cradle 100, and is disposed in an area in front of the cradle 100. For example, when the cradle 100 is mounted in a rear portion of a headrest of a seat in a vehicle facing a back seat, the docking tray 101 is disposed in an area between the rear portion of the headrest and the back seat.

While in the pivot mode, the docking tray 101 may be rotated about a plurality of axes using the pivotable hinge member 501. For example, in an exemplary embodiment, the docking tray 101 may be rotated about two axes. Referring to FIGS. 1 and 4, the docking tray 101 may be rotated about a first axis referred to herein as a rotation axis. Rotating the docking tray 101 (and the tablet device 201 if mounted therein) about the rotation axis changes the orientation of the docking tray 101 (and the tablet device 201 if mounted therein). The docking tray 101 may be rotated a full 360 degrees about the rotation axis. As a result, the docking tray 101 (and the tablet device 201 if mounted therein) may be disposed in a landscape orientation as shown in FIG. 1, or in a portrait orientation as shown in FIG. 4. Referring to FIGS. 8 to 9 and 11 to 12, the docking tray 101 may further be rotated about a second axis referred to herein as a tilt axis. Rotating the docking tray 101 (and the tablet device 201 if mounted therein) about the tilt axis changes the viewing angle of the docking tray 101 (and the tablet device 201 if mounted therein). The docking tray 101 may be rotated up to about 90 degrees in each direction about the tilt axis. Because the docking tray may be rotated a full 360 degrees about the rotation axis and up to about 90 degrees in each direction about the tilt axis, the docking tray 101 may be disposed in many different configurations having many different orientations and viewing angles.

Figure 7:
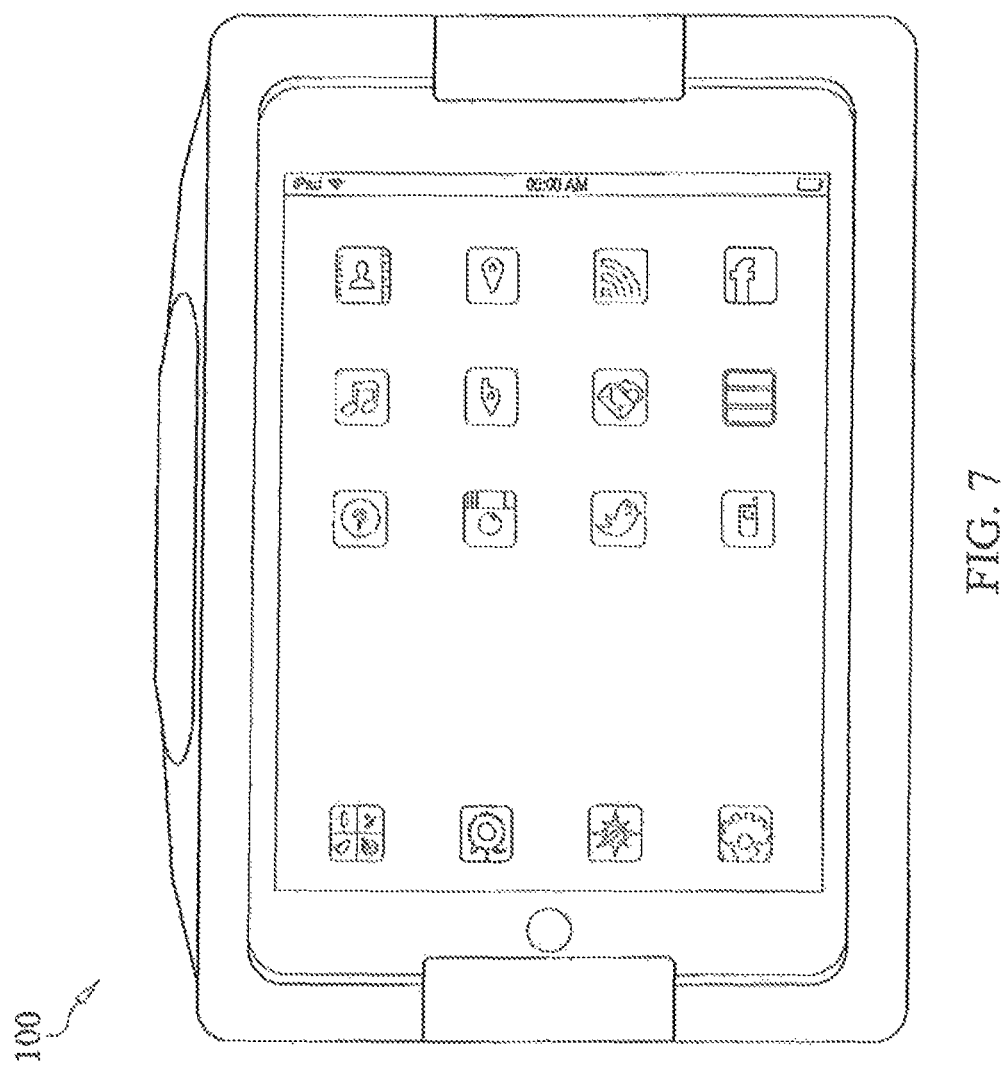
FIGS. 7 to 12 show a front view of docking tray of a cradle mounted in a vehicle while disposed at a plurality of positions and angles relative to the cradle, according to an exemplary embodiment of the present disclosure.
Figure 8:
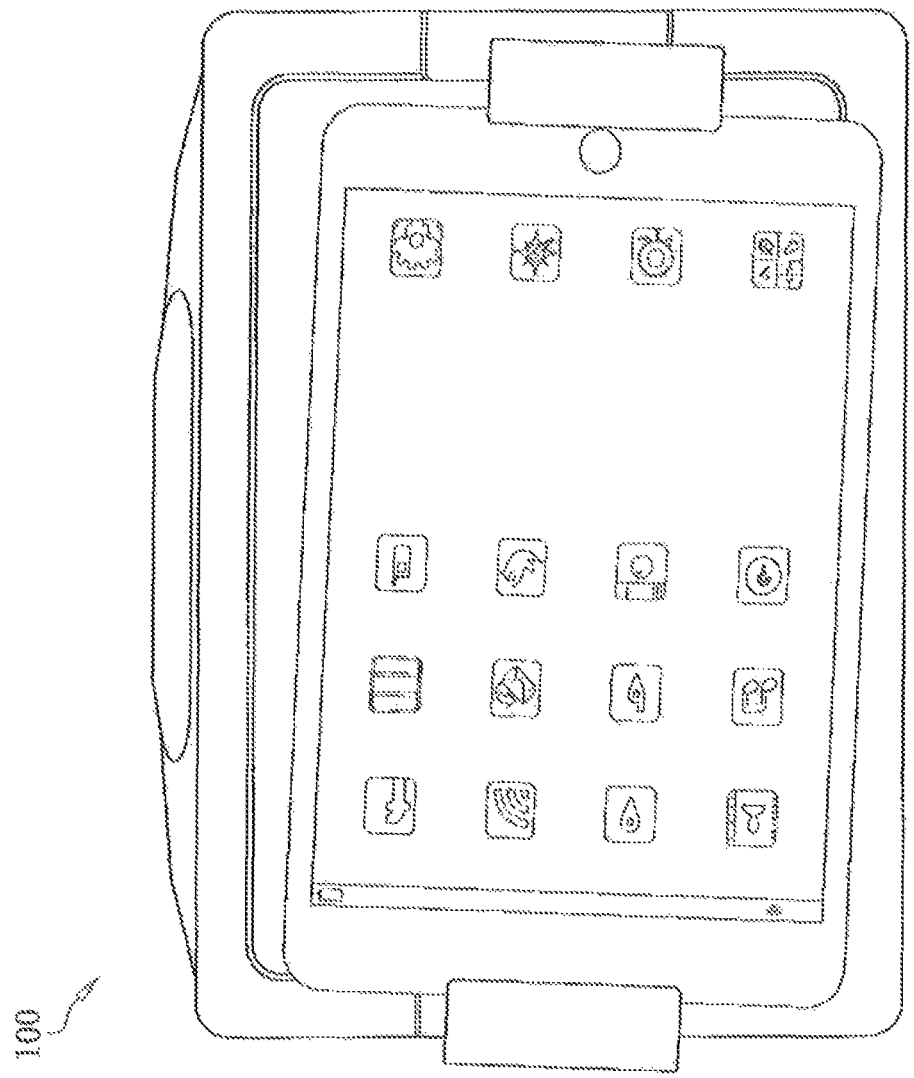
Figure 9:
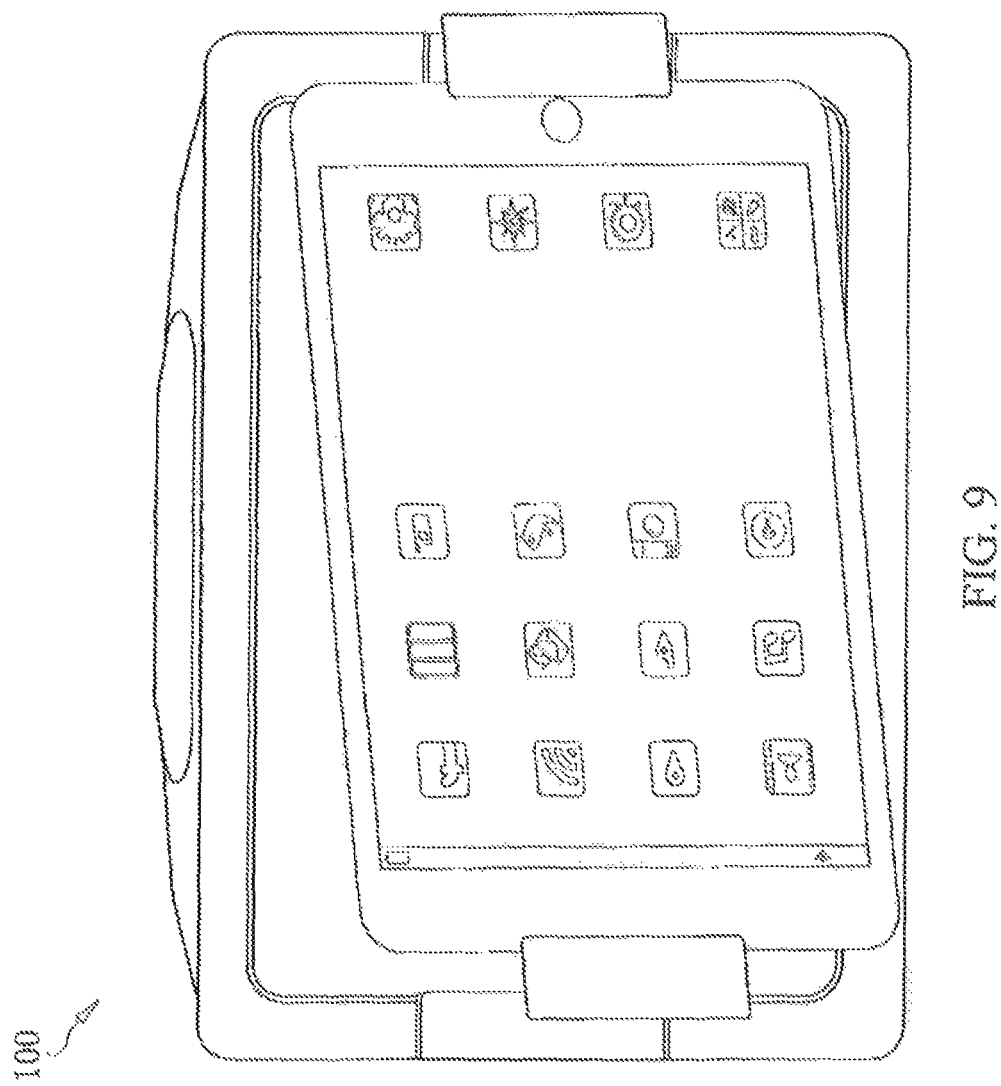
Figure 10:
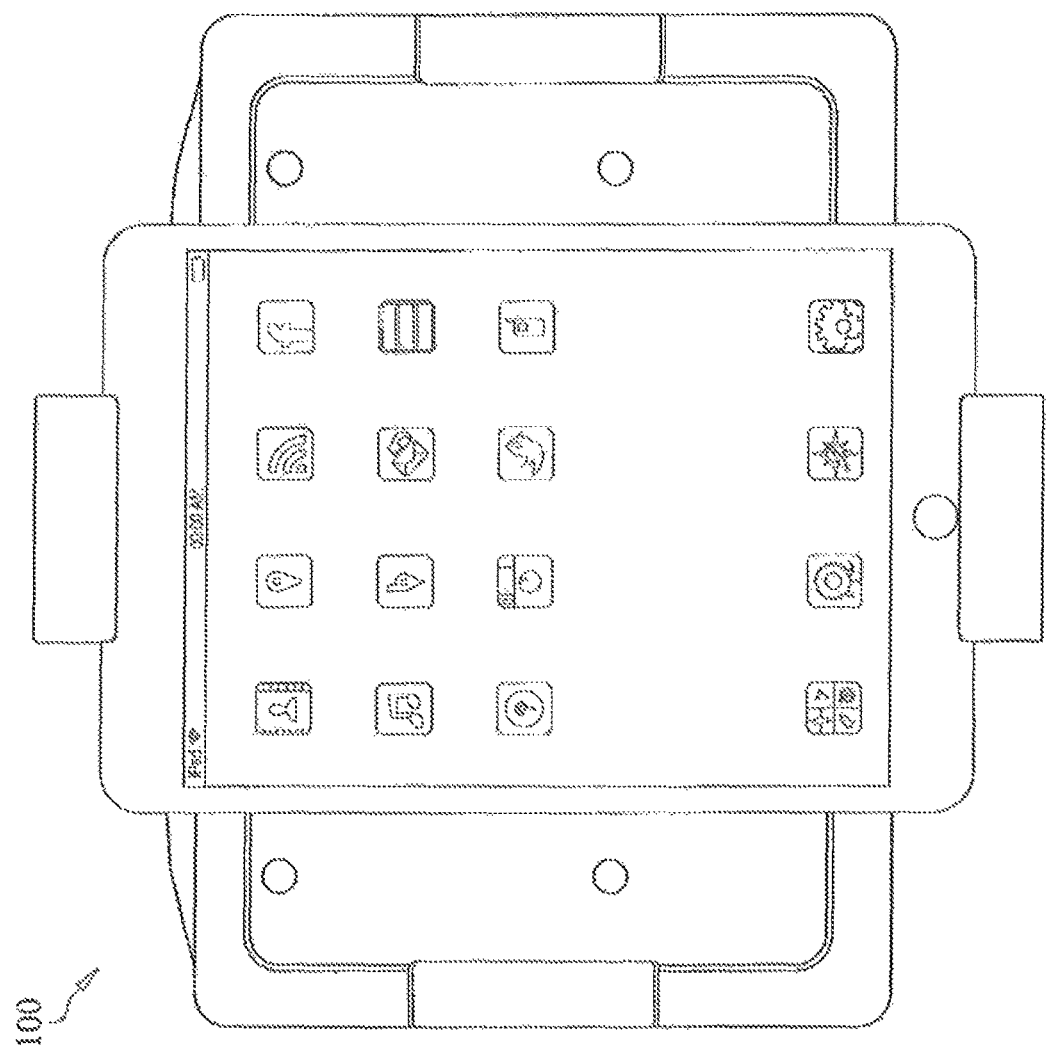
Figure 11:
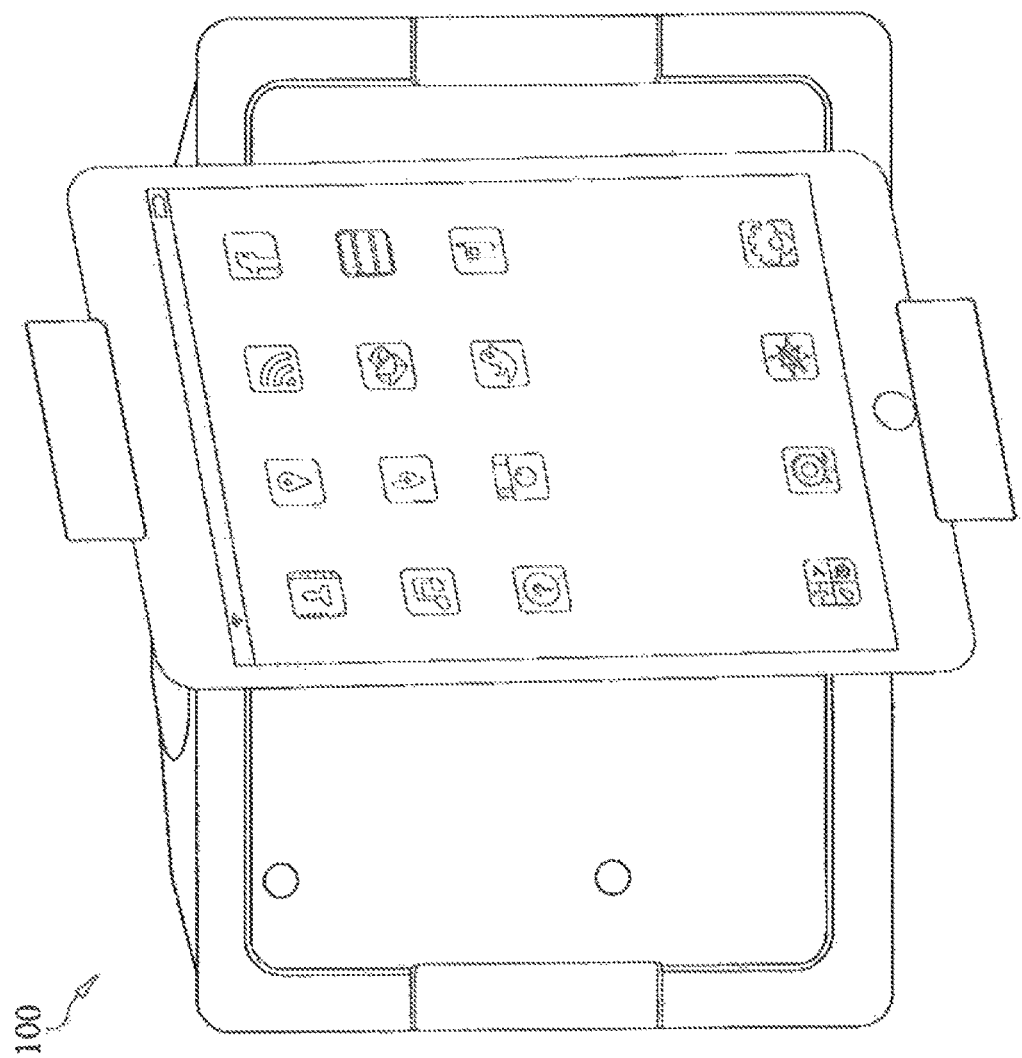
Figure 12:
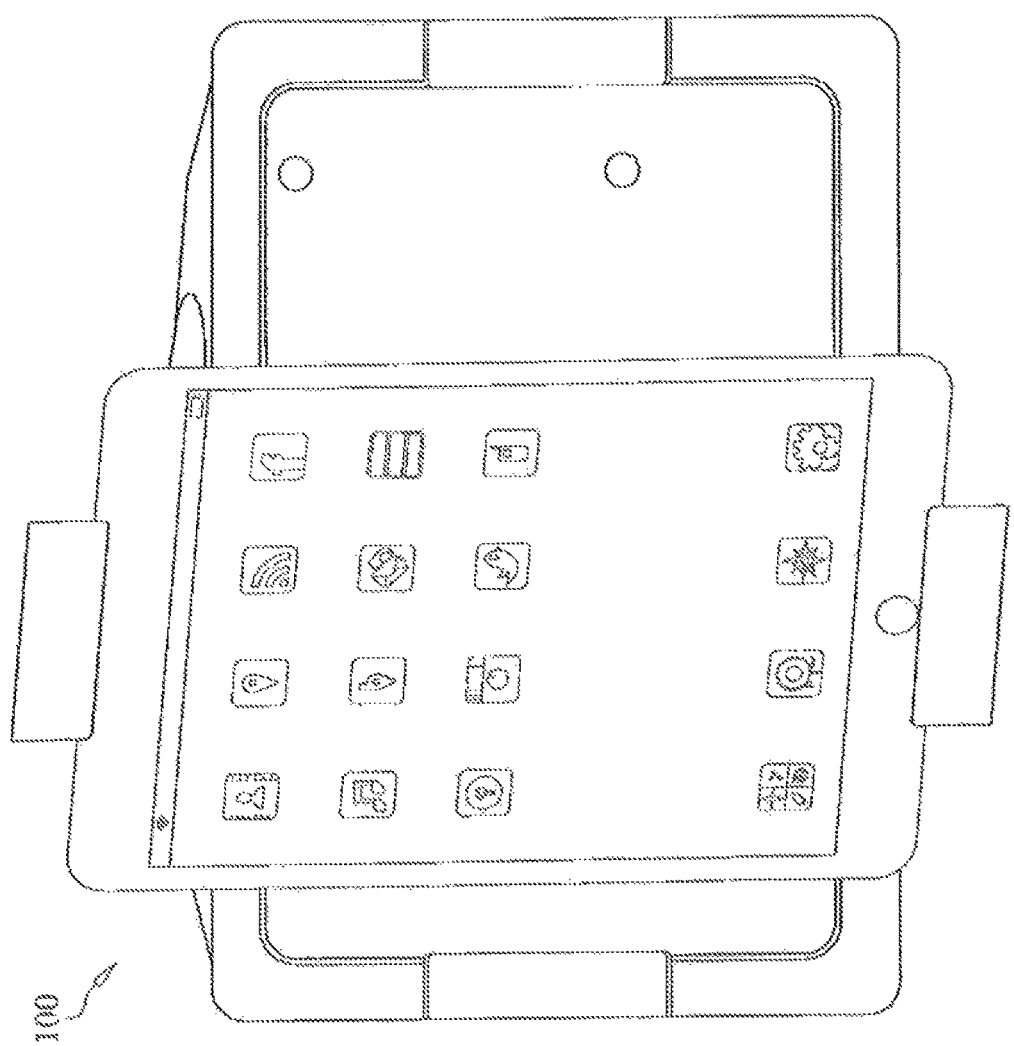

FIGS. 7 to 12 show the docking tray 101, with a tablet device 201 mounted therein, rotated about the rotation axis and the tilt axis at a plurality of different positions and angles while in the pivot mode. As described above, the pivotable hinge member 501 allows the docking tray 201 to be rotated about a rotation axis (e.g., to adjust the orientation of the docking tray 101 and tablet device 201 if mounted therein) and about a tilt axis (e.g., to adjust the viewing angle of the docking tray 101 and tablet device 201 if mounted therein). For example, as shown in FIGS. 7 to 9, the docking tray 101 may be disposed in a landscape orientation, and rotated (e.g., tilted) substantially in a horizontal direction while in the landscape orientation to adjust the viewing angle of the tablet device 201. As shown in FIGS. 10 to 12, the docking tray 101 may be disposed in a portrait orientation, and rotated (e.g., tilted) substantially in a horizontal direction while in the portrait orientation to adjust the viewing angle of the tablet device 201. Rotation of the docking tray 101 about the tilt axis is not limited to when the docking tray 101 is in the landscape and portrait orientations. For example, the docking tray 101 may be disposed at any number of orientations between the landscape orientation and the portrait orientation, and the docking tray 101 may be rotated (e.g., tilted) about the tilt axis at any of these orientations.

As described above, rotation of the docking tray 101 about a plurality of axes (e.g., the rotation axis and the tilt axis) is permitted by the pivotable hinge member 501. For example, in addition to being spring-loaded, which allows the pivotable hinge member 501 to alternate between the first position in which the docking tray 101 is recessed within the cradle 100 and the second position in which the docking tray 101 extends out of the cradle 100, the pivotable hinge member 501 may include a ball joint mechanism, which allows the docking tray 101 to be rotated. (e.g., tilted) about the tilt axis while in the pivot mode. Rotation of the docking tray 101 about the rotation axis and the tilt axis to adjust the orientation and viewing angle of the docking tray 101 (and tablet device 201 if mounted therein) may be accomplished using a variety of mechanisms other than a spring-loaded mechanism and/or a ball joint mechanism, and is not limited thereto.

Figure 13:
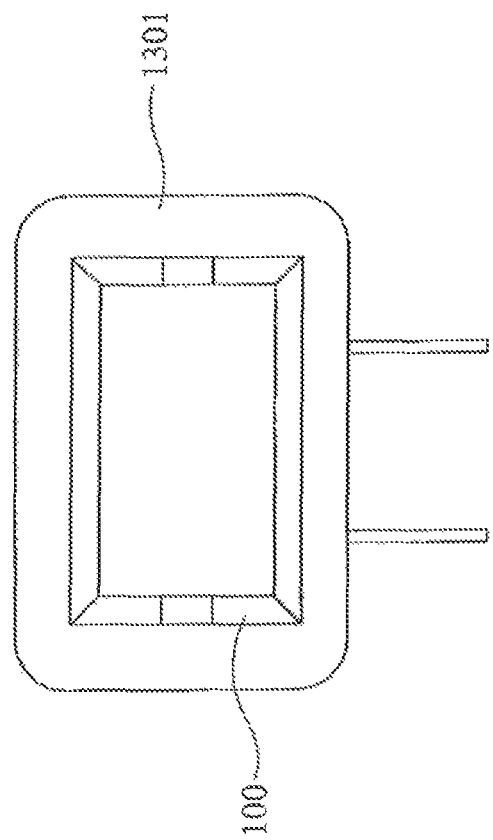
FIG. 13 shows a cradle mounted in a headrest of a seat in a vehicle and configured to receive a tablet device, according to an exemplary embodiment of the present disclosure.

As described above, exemplary embodiments include a cradle 100 configured to be mounted in a variety of locations in a vehicle. For example, in an exemplary embodiment, the cradle 100 may be attached to or disposed in a headrest 1301 of a seat in a vehicle, as shown in FIG. 13. The cradle 100 may be attached to the headrest 1301 by, for example, catches 1401 as shown in FIG. 14, screws 1501 as shown in FIG. 15, adhesives, or epoxies. The cradle may be secured to an internal support structure of the headrest 1301, or attached (e.g., glued or riveted) directly to the body of the headrest 1301. In an exemplary embodiment, the cradle 100 may be disposed in an overhead position in a vehicle, as shown in FIG. 16. For example, a base portion 1601 may be attached to the ceiling 1602 in a vehicle, and the cradle 100 may be attached to the base portion 1601. The base portion 1601 may include a hinge mechanism 1603 allowing the cradle 100 to be pivoted into the base portion 1601 when the tablet device 201 is not in use.

Figure 17:
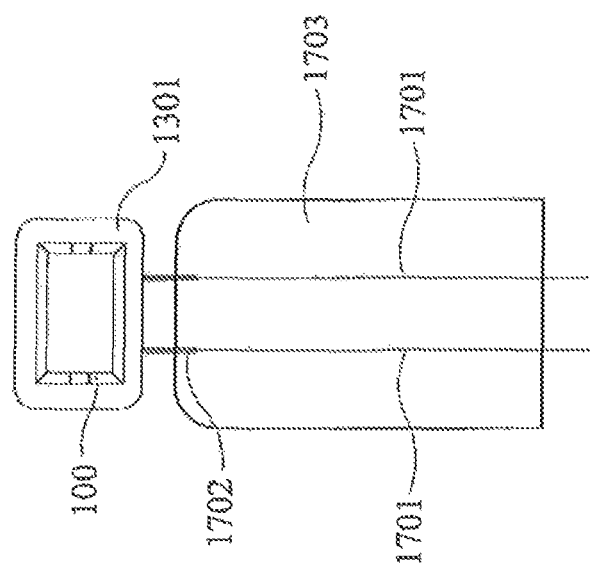
FIG. 17 shows a cradle configured to receive a tablet device electrically connected to a power source and/or an audio/video system of a vehicle, according to an exemplary embodiment of the present disclosure.

The cradle 100 may be electrically connected to the power source and/or audio/video system in the vehicle, thus, connecting the tablet device 201 to the vehicle's power system and/or audio/video system. The cradle 100 may be connected to the vehicle power source and/or audio/video system via power and/or data wires 1701 connecting to the cradle 100 and passing through a headrest post 1702 and the seat 1703, as shown in FIG. 17. The wires 1701 may pass through a single headrest post 1702 or multiple headrest posts 1702. The cradle 100 may include a power input port 502 and/or a data input port 503 to receive the power and/or data wires 1701, as shown in FIG. 5. Further, the cradle 100 may include a wireless transmitter and/or receiver 105 that may utilize a variety of wireless transmission standards including, but not limited to, BLUETOOTH, radio frequency (RF), infrared (IR), or 802.11 (e.g., 802.11 a/b/g/n) transmission standards. The wireless transmitter and/or receiver 105 may be utilized to wirelessly connect the cradle 100 to the vehicle's audio/video system, and/or to receive commands to control the tablet device 201 wirelessly (e.g., via the vehicle console or a remote controller). The cradle 100 may be electrically connected in the vehicle using a wired connection as described above, a wireless connection as described above, or a combination of the wired connection and the wireless connection.

Exemplary embodiments of the cradle 100 may include a wireless transceiver in communication with an external network (e.g., a cellular network), allowing the cradle 100 to function as a wireless hotspot providing an Internet connection and/or a local area network connection to the mounted electronic computing device and/or other mobile devices in and around the vehicle. The cradle 100 may further include a speaker that connects to the mounted electronic computing device via a wired connection through the connection member 103, or via a wireless connection.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A mounting device, comprising:
   a cradle comprising a first recess and configured to be mounted in a vehicle;
   a pivotable hinge member coupled to the cradle; and
   a docking tray coupled to the pivotable hinge member, wherein the docking tray comprises a second recess shaped and dimensioned to receive a rear surface of an electronic computing device,
   wherein the docking tray is configured to alternate between a first position in which the docking tray is recessed within the first recess in the cradle, and a second position in which the docking tray is disposed at a distance away from the cradle in an area in front of the cradle, wherein the first recess is shaped and dimensioned to receive a rear surface of the docking tray, and the rear surface of the docking tray is disposed within the first recess while the docking tray is in the first position, wherein the docking tray alternates between the first position and the second position in response to activating the pivotable hinge member, and the pivotable hinge member is activated by pushing the docking tray in a direction perpendicular to a plane of the docking tray, and wherein the second recess is parallel to the first recess.

2. The mounting device of claim 1, further comprising:
a securing member disposed on a first end of the docking tray; and
a connection member disposed on a second end of the docking tray, opposing the first end,
wherein the connection member comprises a connection port configured to matingly receive a connector of the electronic computing device and supply power to the electronic computing device, and
wherein the securing member is configured to slidably move in a first direction away from the docking tray to receive the electronic computing device into the docking tray, and slidably move in a second direction toward the docking tray to secure the electronic computing device within the docking tray.

3. The mounting device of claim 1, wherein the pivotable hinge member is coupled to the cradle near a center of the cradle and is coupled to the docking tray near a center of the docking tray.

4. The mounting device of claim 1, wherein the docking tray is configured to rotate about a plurality of axes while the docking tray is in the second position.

5. The mounting device of claim 4, wherein the docking tray is configured to rotate about two axes while the docking tray is in the second position.

6. The mounting device of claim 5, wherein a first axis of the two axes is a rotation axis and a second axis of the two axes is a tilt axis, an orientation of the electronic computing device while coupled to the docking tray is adjusted upon rotating the docking tray about the rotation axis, and a viewing angle of the electronic computing device while coupled to the docking tray is adjusted upon rotating the docking tray about the tilt axis.

7. The mounting device of claim 1, wherein the electronic computing device is a tablet device or a smartphone.

8. The mounting device of claim 1, wherein the cradle is disposed in a vehicle headrest.

9. The mounting device of claim 8, wherein a front surface of the electronic computing device is flush with an outer surface of the vehicle headrest while the electronic computing device is coupled to the docking tray and while the docking tray is in the first position.

10. The mounting device of claim 1, wherein the cradle is configured to be disposed in an overhead in the vehicle.

11. A mounting device, comprising:
a cradle comprising a first recess and configured to be mounted in a vehicle;
a pivotable hinge member coupled to the cradle; and
a docking tray coupled to the pivotable hinge member,
wherein the docking tray is configured to alternate between a first locked position in which the docking tray is locked within the first recess in the cradle, and a second locked position in which the docking tray is locked at a distance away from the cradle in an area in front of the cradle,
wherein the docking tray alternates between the first locked position and the second locked position in response to activating the pivotable hinge member,
wherein the pivotable hinge member is activated by pushing the docking tray in a direction perpendicular to a plane of the docking tray, and
wherein the docking tray comprises a second recess shaped and dimensioned to receive a rear surface of an electronic computing device.

12. The mounting device of claim 11, wherein the cradle is disposed in a vehicle headrest.

13. The mounting device of claim 12, wherein a front surface of the electronic computing device is flush with an outer surface of the vehicle headrest while the electronic computing device is coupled to the docking tray and while the docking tray is in the first locked position.

14. The mounting device of claim 11, wherein the docking tray is configured to rotate about a plurality of axes while the docking tray is in the second position.

15. The mounting device of claim 14, wherein a first axis of the plurality of axes is a rotation axis and a second axis of the plurality of axes is a tilt axis, an orientation of the electronic computing device while coupled to the docking tray is adjusted upon rotating the docking tray about the rotation axis, and a viewing angle of the electronic computing device while coupled to the docking tray is adjusted upon rotating the docking tray about the tilt axis.

16. A mounting device, comprising:
a cradle comprising a first recess and configured to be mounted in a vehicle;
a pivotable hinge member coupled to the cradle; and
a docking tray coupled to the pivotable hinge member,
wherein the docking tray is configured to lock in a first position in which the docking tray is disposed within the first recess in the cradle, and lock in a second position in which the docking tray is disposed at a distance away from the cradle in an area in front of the cradle, and
wherein the docking tray comprises a second recess shaped and dimensioned to receive an electronic computing device.

17. The mounting device of claim 16, wherein the docking tray alternates between the first position and the second position in response to activating the pivotable hinge member, and the pivotable hinge member is activated by pushing the docking tray in a direction perpendicular to a plane of the docking tray.

18. The mounting device of claim 16, wherein the cradle is disposed in a vehicle headrest.

19. The mounting device of claim 18, wherein the docking tray alternates between the first position and the second position in response to activating the pivotable hinge member, and the pivotable hinge member is activated by pushing the docking tray in a direction toward the vehicle headrest.

20. The mounting device of claim 18, wherein a front surface of the electronic computing device is flush with an outer surface of the vehicle headrest while the electronic computing device is coupled to the docking tray and while the docking tray is in the first position.

* * * * *